(12) United States Patent
Lin

(10) Patent No.: US 7,342,746 B1
(45) Date of Patent: Mar. 11, 2008

(54) DISK DRIVE INCLUDING A BALANCING RING WITH A BALANCING WEIGHT ATTACHED TO A LOWER END OF A SPINDLE MOTOR HUB

(75) Inventor: Joseph T. Lin, Cupertino, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 376 days.

(21) Appl. No.: 11/117,866

(22) Filed: Apr. 28, 2005

(51) Int. Cl.
*G11B 17/02* (2006.01)
(52) U.S. Cl. .................. 360/99.08; 360/99.12
(58) Field of Classification Search ............ 360/99.08, 360/98.07, 99.04; 310/51, 81, 154.25
See application file for complete search history.

(56) References Cited

U.S. PATENT DOCUMENTS

| | | | |
|---|---|---|---|
| 2,334,285 A * | 11/1943 | Philippi ............... | 74/571.1 |
| 5,422,776 A | 6/1995 | Thorson et al. | |
| 5,555,144 A * | 9/1996 | Wood et al. ......... | 360/98.08 |
| 5,621,588 A | 4/1997 | Williams et al. | |
| 6,242,826 B1 * | 6/2001 | Saito et al. ........... | 310/51 |
| 6,356,409 B1 * | 3/2002 | Price et al. ........... | 360/98.07 |
| 6,550,328 B1 | 4/2003 | Horning et al. | |
| 6,608,733 B2 * | 8/2003 | Elsing ................. | 360/99.08 |
| 6,816,338 B1 * | 11/2004 | Suwito ................ | 360/99.12 |
| 7,130,151 B2 * | 10/2006 | Nakamiya et al. .... | 360/98.07 |

FOREIGN PATENT DOCUMENTS

JP 06096556 A * 4/1994
JP 11353788 A * 12/1999

* cited by examiner

*Primary Examiner*—Angel Castro
*Assistant Examiner*—Christopher R. Magee
(74) *Attorney, Agent, or Firm*—Joshua C. Harrison, Esq.

(57) ABSTRACT

A disk drive includes a disk drive base and a spindle motor including a spindle motor hub, a spindle motor shaft and a stator. The hub includes an upper end and a lower end. The hub is rotatably coupled to the base via the shaft for rotating the hub about an axis of rotation. The lower end is disposed towards the disk drive base. The stator is attached to the base adjacent the lower end. A balancing ring is attached to the lower end of the hub about the shaft. The disk drive further includes a balancing weight attached to the ring. The weight is attachable to the ring through the disk drive base with the ring attached to the lower end of the hub. A method of balancing the hub is further provided using the ring and the weight.

13 Claims, 7 Drawing Sheets

DISK DRIVE INCLUDING A BALANCING RING WITH A BALANCING WEIGHT ATTACHED TO A LOWER END OF A SPINDLE MOTOR HUB

FIELD OF THE INVENTION

The present invention relates generally to disk drives, and in particular to a disk drive including a balancing ring with a balancing weight attached to a lower end of a spindle motor hub.

BACKGROUND

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit assembly. A conventional "rotary" or "swing-type" actuator assembly typically includes a rotary actuator having an actuator body. The actuator body has a bore and a pivot bearing cartridge engaged within the bore to facilitate rotational movement of the actuator assembly between limited positions about an axis of rotation. A coil support extends from one side of the actuator body. An actuator coil is supported by the coil support and is configured to interact with one or more permanent magnetic elements, typically a pair, to form a voice coil motor. One or more actuator arms extend from an opposite side of the actuator body. Each head gimbal assembly includes a head that typically includes a transducer for writing and reading data and that is distally attached to each of the actuator arms. Each transducer typically includes a writer and a read element. The transducer's writer can be of a longitudinal or perpendicular design, and the read element of the transducer may be inductive or magnetoresistive. Each magnetic disk includes opposing disk surfaces. Data may be recorded along data annular regions on a single disk surface or both. As such, the head stack assembly may be pivoted such that each head is disposed adjacent to the various data annular regions from adjacent to the outer diameter to the inner diameter of each disk.

The spindle motor typically includes a spindle motor base, a spindle motor shaft, a rotatable spindle motor hub, a stator disposed at the disk drive base, a magnet attached to an underside of the spindle motor hub, and a bearing cartridge disposed between the spindle motor shaft and the spindle motor hub to facilitate rotational attachment of the spindle motor hub to the spindle motor base. The spindle motor hub may include an outer flange which is used to support one or more of the disks. The disks may be separated by disk spacers. A disk clamp and disk clamp screws may be used to secure the disks to the spindle motor hub. The various rotating elements associated with the disks may be referred to as a disk pack.

The stator typically includes a series of coils and is concentrically positioned about the spindle motor shaft, adjacent the spindle motor hub. The coils are in electrical communication with the printed circuit board assembly. With this general configuration, the various coils of the stator are selectively energized to form an electromagnetic field that pulls/pushes on the magnet otherwise associated with the spindle motor hub, thereby imparting a rotational motion onto the spindle motor hub. Rotation of the spindle motor hub results in the rotation of the overall disk pack including the attached disks.

A topic of concern is rotational balancing of the spindle motor and the overall disk pack. It is important that the mass of the disk pack be balanced so as to reduce dynamic vibrations during operation of the disk drive. Excessive imbalance can degrade the disk drive performance not only in terms of read/write errors, but also in terms of seek times. Excessive imbalance may result in an undesirable acoustic signature and may even result in damage or excessive wear to various disk drive components.

Accordingly, there is a need in the art for an improved configuration and method for balancing of the spindle motor and/or the overall disk pack.

SUMMARY

A disk drive includes a disk drive base. The disk drive further includes a spindle motor including a spindle motor hub, a spindle motor shaft and a stator. The spindle motor hub includes an upper end and an opposing lower end. The spindle motor hub is rotatably coupled to the disk drive base via the spindle motor shaft for rotating the spindle motor hub about an axis of rotation. The lower end is disposed towards the disk drive base. The stator is attached to the disk drive base adjacent the lower end. The disk drive further includes a balancing ring attached to the lower end of the spindle motor hub about the spindle motor shaft. The disk drive further includes a balancing weight attached to the balancing ring. The balancing weight is attachable to the balancing ring through the disk drive base with the balancing ring attached to the lower end of the spindle motor hub.

According to various embodiments, the balancing ring may be a C-ring and includes opposing ring ends. The balancing weight may be attached to the balancing ring equidistant from the ring ends. The disk drive base may include a ring access opening sized and configured to extend over the ring ends for allowing access to the ring ends through the disk drive base. The disk drive base may include a weight access opening sized and configured to receive the balancing weight through the weight access opening for attachment of the balancing weight to the balancing ring. The ring ends may be positionable adjacent the ring access opening while the balancing weight is disposed adjacent the weight access opening. The disk drive base may include a weight access opening sized and configured to receive the balancing weight through the weight access opening for attachment of the balancing weight to the balancing ring. The balancing ring may be attached to the lower end with the balancing ring in contraction. The balancing ring may be attached to the lower end with the balancing ring in expansion. The balancing weight may be a screw. The lower end of the spindle motor hub may include a circular groove disposed about the axis of rotation, and the balancing ring may be disposed in the circular groove.

According to another embodiment of the present invention, there is provided a method of balancing the spindle motor hub of the disk drive. The disk drive includes the disk drive base and the spindle motor. The spindle motor includes the spindle motor hub. The spindle motor shaft and the stator. The spindle motor hub includes an upper end and an opposing lower end. The method includes the act of providing a balancing ring at the disk drive base. The method further includes rotatably attaching the spindle motor hub to the disk drive base via the spindle motor shaft for rotating the spindle motor hub about an axis of rotation. The lower end is disposed towards the disk drive base. The stator is attached to the disk drive base adjacent the lower end. The balancing ring is disposed between the lower end of the spindle motor hub about the spindle motor shaft. The method further includes rotating the spindle motor hub. The method further includes determining an imbalance reference angle of the spindle motor hub relative to the disk drive base. The method further includes attaching a balancing weight to the balancing ring. The method further includes angularly positioning the balancing weight with respect to the lower end of the spindle motor hub based upon the imbalance reference angle.

According to various embodiments, the method may further include determining an imbalance magnitude of the spindle motor hub. The balancing weight may be selectively chosen from a group of balancing weights of differing weights based upon the imbalance magnitude. The method may further include moving the balancing ring from the disk drive base and attaching the balancing ring to the lower end of the spindle motor hub. The balancing ring may be attached to the lower end of the spindle motor hub after the attachment of the balancing weight to the balancing ring.

DESCRIPTION OF THE PREFERRED EMBODIMENTS

Figure 1:
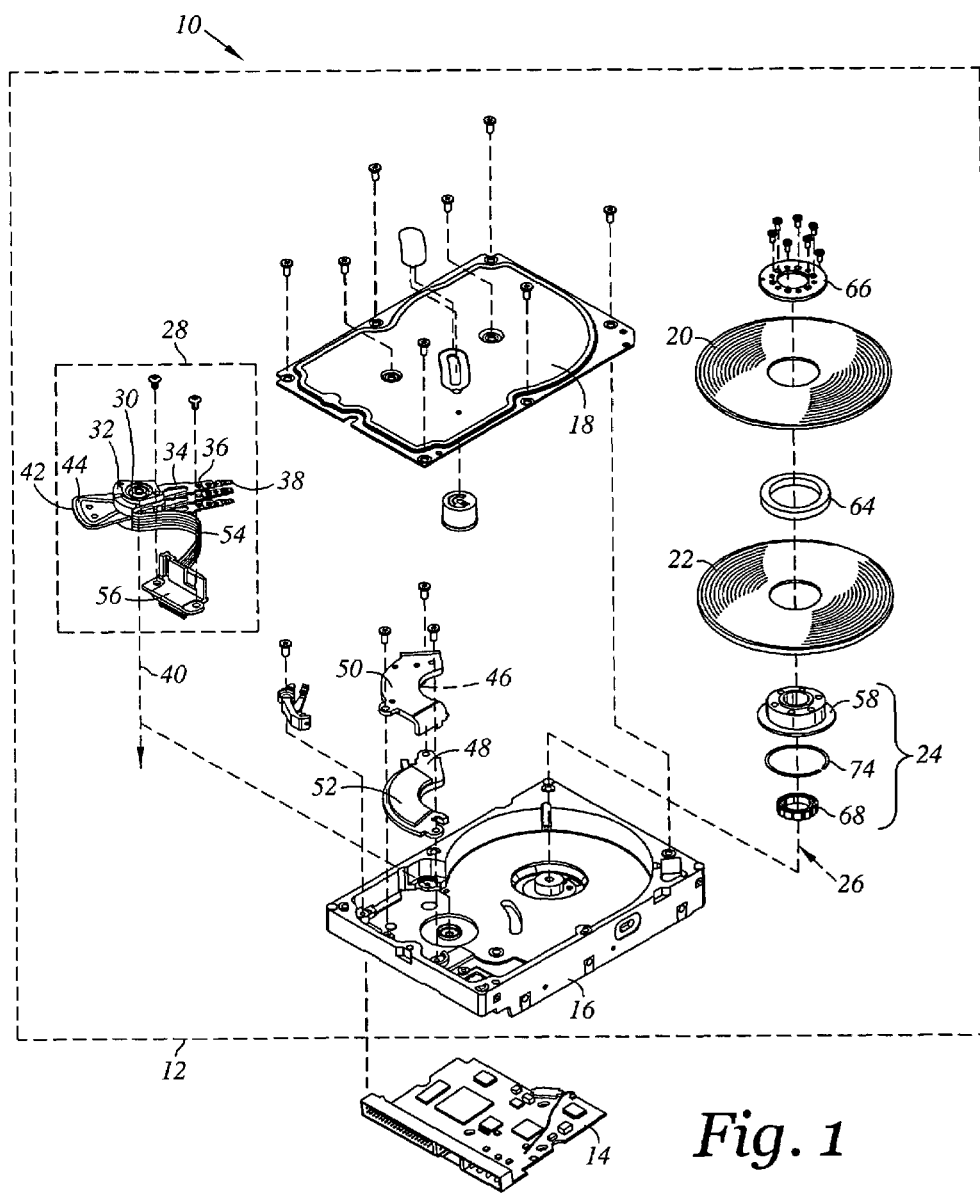
FIG. 1 is an exploded top perspective view of a disk drive in accordance with an embodiment of the present invention.

Referring now to FIG. 1, there is depicted an exploded perspective view of a disk drive 10 as constructed in accordance with an embodiment of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house disks 20, 22. The disks 20, 22 each include a plurality of tracks for storing data. The head disk assembly 12 further includes a spindle motor 24 for rotating the disks 20, 22 about a disk rotation axis 26. The head disk assembly 12 further includes a head stack assembly 28 rotatably attached to the disk drive base 16 in operable communication with the disk 20. The head stack assembly 28 includes a rotary actuator 30.

The rotary actuator 30 includes an actuator body 32 and actuator arms 34 (for ease of illustration only the topmost one is denoted) that extend from the actuator body 32. Distally attached to the actuator arms 32 are suspension assemblies 36 (for ease of illustration only the topmost one is denoted). The suspension assemblies 36 respectively support heads 38 (for ease of illustration only the topmost one is denoted). Each of the heads 38 includes a transducer that typically includes a writer and a read element. The suspension assemblies 36 with the heads 38 are referred to as head gimbal assemblies. It is contemplated that the number of actuator arms and suspension assemblies may vary depending upon the number of disks and disk surfaces utilized.

In the embodiment shown, the actuator body 32 includes a bore, and the rotary actuator 30 further includes a pivot bearing cartridge engaged within the bore for facilitating the actuator body 32 to rotate between limited positions about an axis of rotation 40. The actuator 30 further includes a coil support 42 that extends from one side of the actuator body 33 opposite the actuator arms 34. The coil support 42 is configured to support an actuator coil 44.

First and second of magnetic elements 46, 48 are supported by magnetic element supports 50, 52 which are attached to the disk drive base 16. The actuator coil 44 interacts with the first and second magnetic elements 46, 48 (the first magnetic element 46 is denoted in dashed lining and it is understood that it is disposed at an underside of the magnetic element support 50) to form a voice coil motor for controllably rotating the actuator 30. The head stack assembly 28 further includes a flex circuit assembly 54 and a cable connector 56. The cable connector 56 is attached to the disk drive base 16 and is disposed in electrical communication with the printed circuit board 14. The flex circuit assembly 54 supplies current to the actuator coil 44 and carries signals between the heads 38 and the printed circuit board assembly 14.

The spindle motor 24 includes a spindle motor hub 58 that is rotatably attached to the disk drive base 16. The spindle motor hub 58 has a hub body 60 and a hub flange 62 that extends from the hub body 60. The hub flange 62 includes a supporting surface for supporting a lowermost one of the disks, namely disk 22. The remaining disk 20 is stacked and separated with an annular disk spacer 64 that are disposed about the hub body 60. A disk clamp 66 is attached about the spindle motor hub 58 and is utilized to apply a clamping force against the topmost disk 20 for securing the disks 20, 22 to the spindle motor hub 58.

Figure 12:
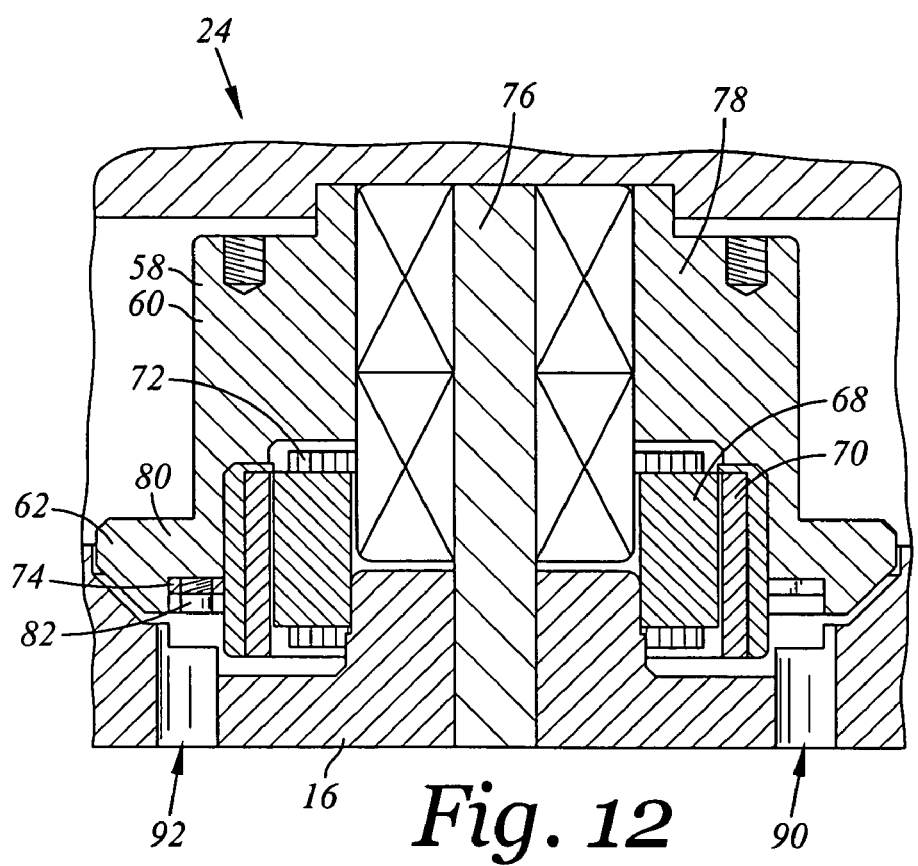
FIG. 12 is the cross-sectional view of the portion of the disk drive base, the spindle motor and balancing ring of FIG. 11 as seen along axis 12-12 of FIG. 2, with the balancing ring attached to a spindle motor hub of the spindle motor.

With further reference to the cross-sectional view of FIG. 12, the spindle motor 24 further includes a stator 68 attached to the disk drive base 16 and a magnet 70 attached to the spindle motor hub 58. The stator 68 includes a series of coils 72 that are in electrical communication with the printed circuit board assembly 14. The various coils 72 of the stator 68 are selectively energized to form an electromagnetic field that pulls/pushes on the magnet 70, thereby imparting a rotational motion onto the spindle motor hub 58 for rotating the disks 20, 22. The various rotating members may be collectively referred to as a disk pack. In this regard, the disk pack may include the disks 20, 22, the spindle motor hub 58, the magnet 70, the disk spacer 64 and the disk clamp 66. As will be discussed in detail below, the spindle motor 24 further includes a balancing ring 74.

According to an embodiment of the present invention there is provided the disk drive 10. The disk drive 10 includes the disk drive base 16. The disk drive 10 further includes the spindle motor 24 including the spindle motor hub 58, a spindle motor shaft 76 and the stator 68. The spindle motor hub 58 includes an upper end 78 and an opposing lower end 80. The spindle motor hub 58 is rotatably coupled to the disk drive base 16 via the spindle motor shaft 76 for rotating the spindle motor hub 58 about the axis of rotation 26. The lower end 80 is disposed towards the disk drive base 16. The stator 68 is attached to the disk drive base 16 adjacent the lower end 80. The disk drive 10 further includes the balancing ring 74 attached to the lower end 80 of the spindle motor hub 58 about the spindle motor shaft 76. The disk drive 10 further includes a balancing weight 82 attached to the balancing ring 74. The balancing weight 82 is attached to the balancing ring 74 through the disk drive base 16 with the balancing ring 74 attached to the lower end 80 of the spindle motor hub 58. As such, this arrangement contemplates a balancing of the spindle motor hub 58 while it is installed with the disk drive base 16, rather than prior to installation.

Utilization of the balancing ring 74 with balancing weight 82 at the lower end 80 of the installed spindle motor hub 58 facilitates balancing in a dimension additional to that possible if balancing were only done at the upper end 78, and therefore provides a relatively more comprehensive disk pack balancing approach. In contrast, balancing only at the upper end 78 would address imbalance only in a single plane orthogonal to the axis of rotation 26.

Figure 3:
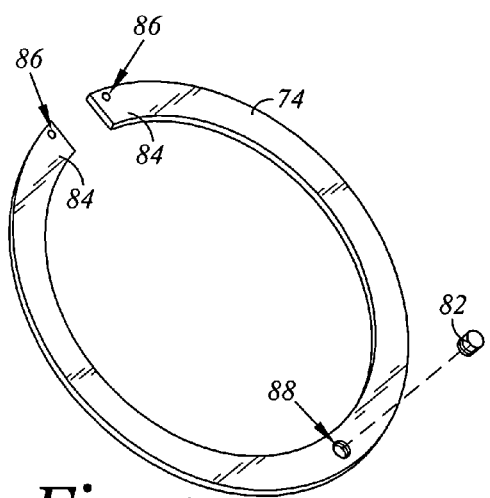
FIG. 3 is an enlarged exploded perspective view of the balancing ring and the balancing weight.

Referring now to FIG. 3 there is depicted an enlarged exploded perspective view of the balancing ring 74 and the balancing weight 82. According to various embodiments, the balancing ring 74 may be open or closed in nature. In the embodiment shown, the balancing ring 74 is a C-ring. The balancing ring 74 includes opposing ring ends 84. Each of the ring ends 84 includes an installation hole 86. The installation holes 86 may be engaged by installation tooling (not shown) for expanding/contracting the balancing ring 74 during installation.

The balancing weight 82 may be attached to the balancing ring 74 in any number of configurations. In the embodiment shown, the balancing weight 82 is attached equidistant from the ring ends 84. The balancing ring 74 may further include a weight engagement hole 88. The balancing weight may take the form of a screw that is engaged in the weight engagement hole 88. The balancing weight 82 may further be attached such as being press-fit, snapped on, or glued to the balancing ring 74. The balancing ring 74 may be formed of any number of materials which may be chosen from those which are well known to one of ordinary skill in the art such as a metal such as stainless steel. Likewise, the balancing weight 82 may be formed of any number of materials which may be chosen from those which are well known to one of ordinary skill in the art, such as various metal materials and plastics.

Figure 2:
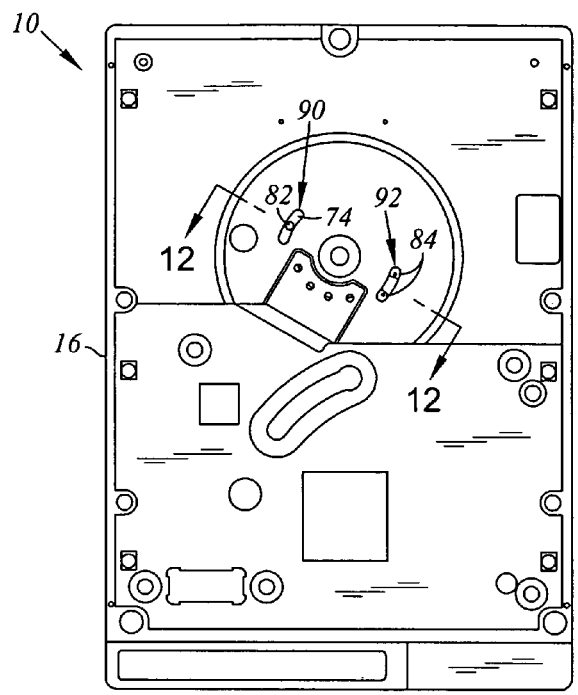
FIG. 2 is a bottom plan view of the disk drive of FIG. 1 including a disk drive base and portions of a balancing ring with a balancing weight.
Figure 4:
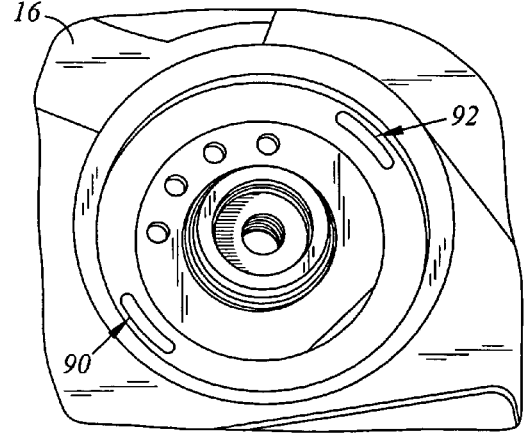
FIG. 4 is an enlarged top perspective view of a portion of the disk drive base.
Figure 5:
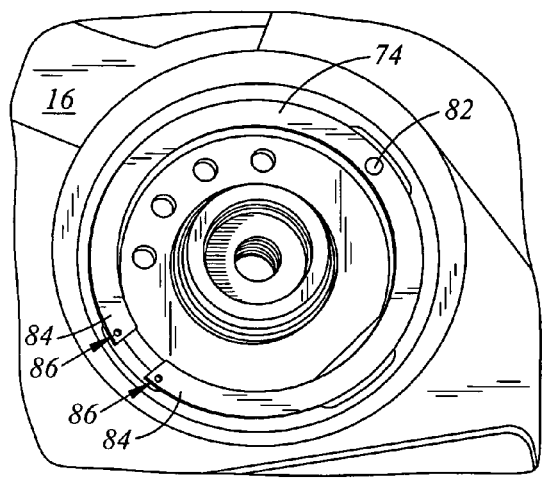
FIG. 5 is the view of the portion of the disk drive base of FIG. 4, however, with the balancing ring and balancing weight.
Figure 6:
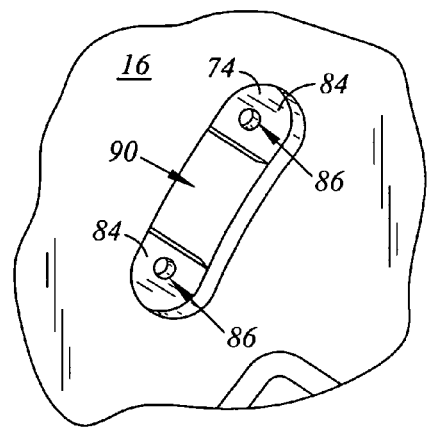
FIG. 6 is an enlarged bottom perspective view of a portion of the disk drive base including a ring access opening and ring ends of the balancing ring.
Figure 7A:
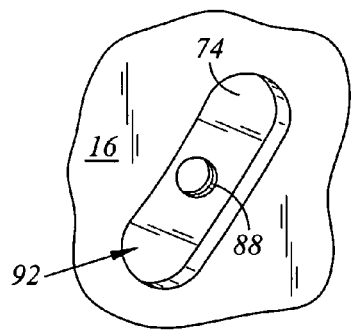
FIG. 7a is an enlarged bottom perspective view of a portion of the disk drive base including a weight access opening and a portion of the balancing ring.
Figure 7B:
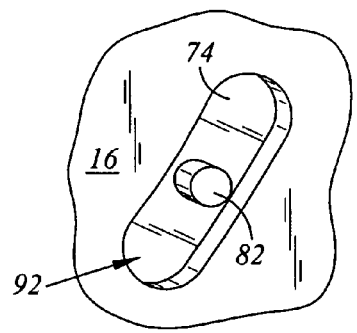
FIG. 7b is the portion of the disk drive base and the portion of the balancing ring of FIG. 7a as shown with the balancing weight.
Figure 8:
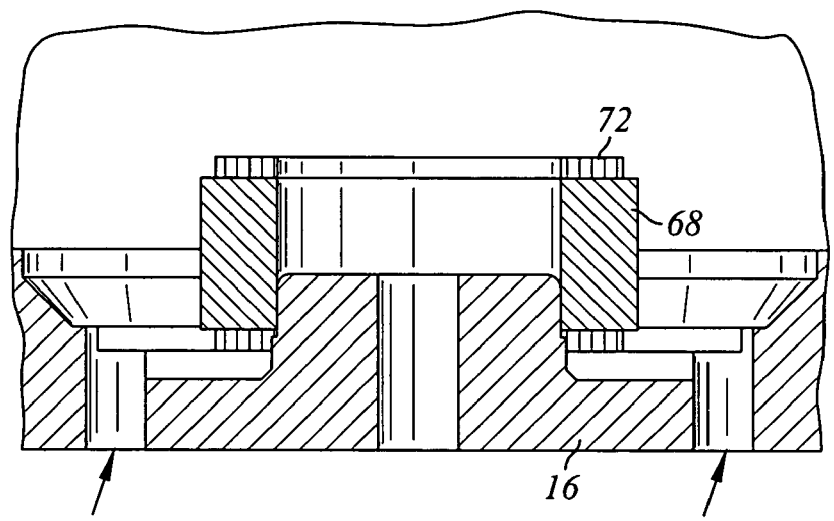
FIG. 8 is a cross-sectional view of a portion of the disk drive base as seen along axis 12-12 of FIG. 2.
Figure 9:
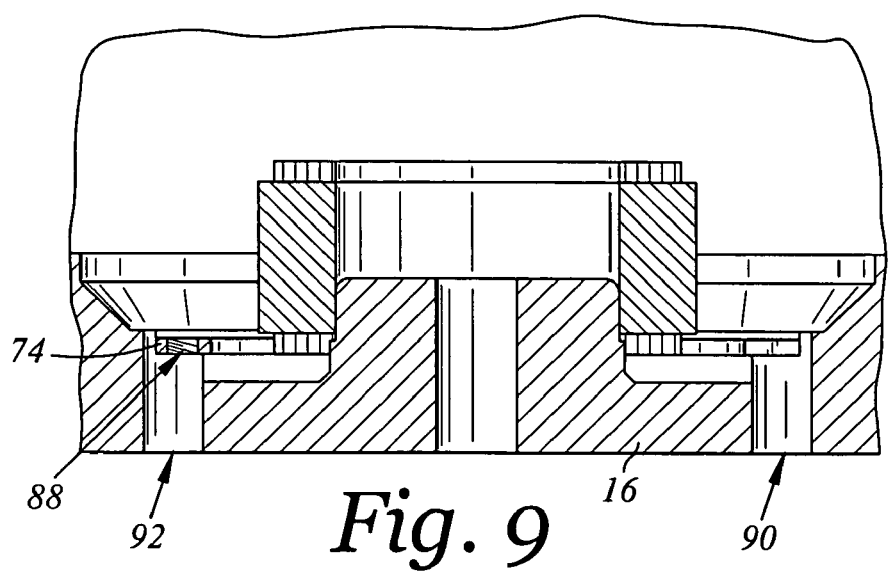
FIG. 9 is the cross-sectional view of the portion of the disk drive base of FIG. 8 as shown with the balancing ring attached to the disk drive base.
Figure 10:
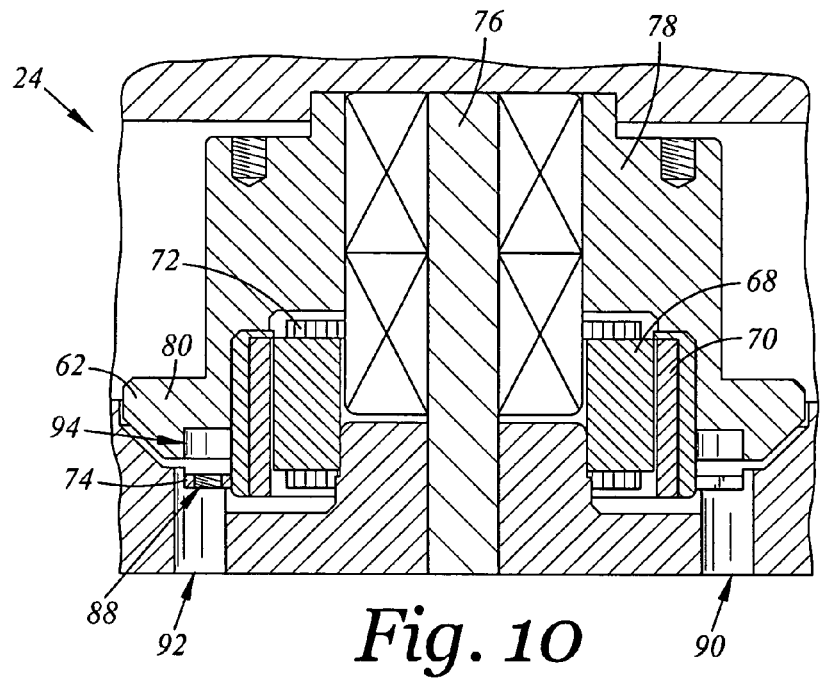
FIG. 10 is the cross-sectional view of the portion of the disk drive base and balancing weight of FIG. 9 as shown with a spindle motor attached to the disk drive base.
Figure 11:
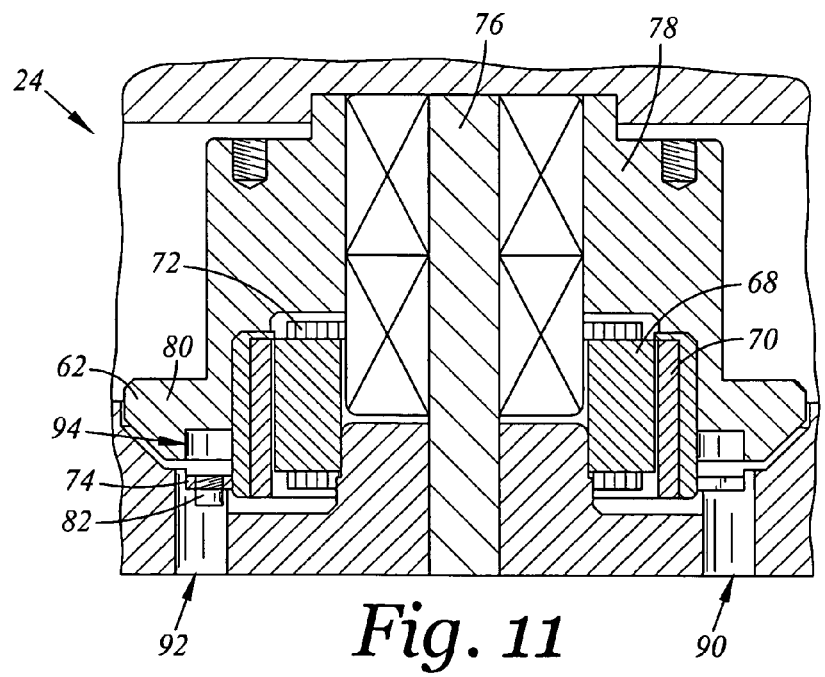
FIG. 11 is the cross-sectional view of the portion of the disk drive base, the spindle motor, and the balancing ring of FIG. 10, as shown with the balancing weight attached to the balancing ring.

Referring now to FIG. 2, there is depicted a bottom plan view of the disk drive 10 of FIG. 1 including the disk drive base 16 and portions of the balancing ring 74 with a balancing weight 82. In the embodiment shown, the disk drive base 16 includes a ring access opening 90 and a weight access opening 92. FIG. 4 is an enlarged top perspective view of a portion of the disk drive base 10 including the ring access opening 90. FIG. 5 is the view of the portion of the disk drive base 16 of FIG. 4, however, with the balancing ring 74 and balancing weight 82. In this regard as discussed below, the balancing ring 74 may initially be disposed upon the disk drive base 16 prior to its final installed location with the spindle motor hub 58. FIG. 6 is an enlarged bottom perspective view of a portion of the disk drive base 16 including the ring access opening 90 and the ring ends 84 of the balancing ring 74. FIG. 7a is an enlarged bottom perspective view of a portion of the disk drive base 16 including the weight access opening 92 and a portion of the balancing ring 74. FIG. 7b is the portion of the disk drive base 16 and the portion of the balancing ring 74 of FIG. 7a as shown with the balancing weight 82. As will be discussed in more detail below, the balancing ring 74 may initially be disposed upon the disk drive base 16 prior to being moved to the spindle motor hub 58. FIG. 8 is a cross-sectional view of a portion of the disk drive base 16 as seen along axis 12-12 of FIG. 2. FIG. 9 is the cross-sectional view of the portion of the disk drive base 16 of FIG. 8 as shown with the balancing ring 74 attached to the disk drive base 16. FIG. 10 is the cross-sectional view of the portion of the disk drive base 16 and the balancing weight 82 of FIG. 9 as shown with a spindle motor 24 attached to the disk drive base 16. FIG. 11 is the cross-sectional view of the portion of the disk drive base 16, the spindle motor 24, and the balancing ring 74 of FIG. 10, as shown with the balancing weight 82 attached to the balancing ring. FIG. 12 is the cross-sectional view of the portion of the disk drive base 16, the spindle motor 24 and balancing ring 74 of FIG. 11 as seen along axis 12-12 of FIG. 2, with the balancing ring 74 attached to a spindle motor hub 58 of the spindle motor 24.

The ring access opening 90 may be sized and configured to extend over the ring ends 84 for allowing access to the ring ends 84 through the disk drive base 16. In this regard, installation tooling (not shown) may be used to engage the installation holes 86 through the ring access opening 90. The weight access opening 92 may be sized and configured to receive the balancing weight 82 through the weight access opening 92 for attachment of the balancing weight 82 to the balancing ring 74. The ring access opening 90 and weight access opening 92 may be arced slotted shaped as shown. Further, while the ring access opening 90 and the weight access opening 92 are shown as distinct in the embodiment show, it is contemplated that they may be the same opening. The ring ends 84 may be positionable adjacent the ring access opening 90 while the balancing weight 82 is disposed adjacent the weight access opening 92.

As mentioned above the balancing ring 74 is attached to the lower end 80 of the spindle motor 24. In this regard, the lower end 80 of the spindle motor 24 is a relative term in comparison to the upper end 78. As such, the upper and lower ends 78, 80 refer to opposite halves of the spindle motor 24 with the upper end 78 being generally disposed closer to the cover 18 than the disk drive base 16. As further mentioned above the lower end 80 is disposed towards the disk drive base 16. This refers to the lower end 80 generally facing the drive base 16 in comparison to the cover 18.

The balancing ring 74 may be attached to the lower end 80 with the balancing ring 74 in either expansion or contraction. As shown in FIGS. 10-12, the lower end 80 of the spindle motor hub 58 may include a circular groove 94 disposed about the axis of rotation 26. The balancing ring 74 may be disposed in the circular groove 94.

Figure 13:
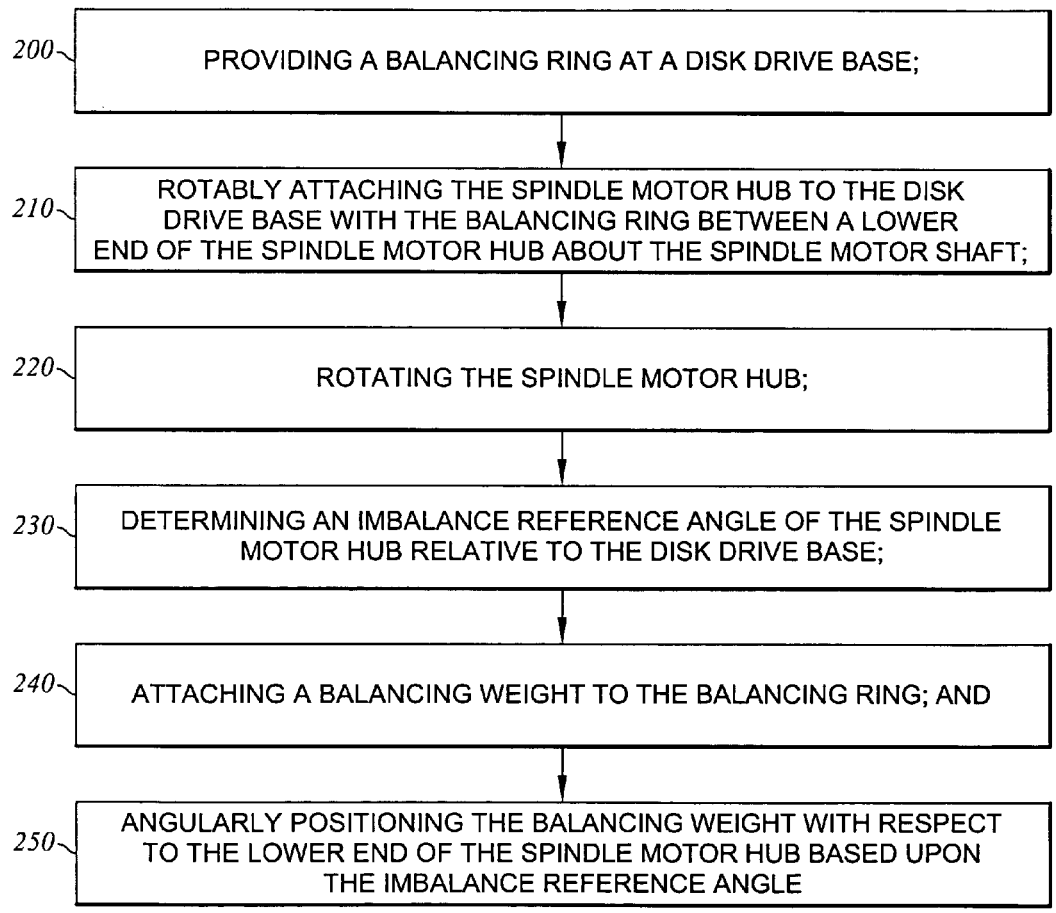
FIG. 13 is a flow chart of a method of balancing the spindle motor hub according to another embodiment of the present invention.

Referring now to the flow chart of FIG. 13, according to another embodiment of the present invention, there is provided a method of balancing the spindle motor hub 58 of the disk drive 10. The disk drive 10 includes the disk drive base 16 and the spindle motor 24. The spindle motor 24 includes the spindle motor hub 58, the spindle motor shaft 76 and the stator 68. The spindle motor hub 58 includes the upper end 78 and the opposing lower end 80. The method includes the act 200 of providing the balancing ring 74 at the disk drive base 16 such as shown in FIGS. 5, 6, 7a and 9. Referring now to FIG. 10, the method further includes the act 210 of rotatably attaching the spindle motor hub 58 to the disk drive base 16 via the spindle motor shaft 76 for rotating the spindle motor hub 58 about an axis of rotation 26. The lower end 80 is disposed towards the disk drive base 16. The stator 68 is attached to the disk drive base 16 adjacent the lower end 80. The balancing ring 74 is disposed between the lower end 80 of the spindle motor hub 58 about the spindle motor shaft 76. The method further includes the act 220 of rotating the spindle motor hub 58. The method further includes the act 230 determining an imbalance reference angle of the spindle motor hub 58 relative to the disk drive base 16. The method further includes the act 240 attaching the balancing weight 82 to the balancing ring 74. The method further includes the act 250 angularly positioning the balancing weight 82 with respect to the lower end 80 of the spindle motor hub 58 based upon the imbalance reference angle.

As mentioned above, the stator 68 may be attached to the disk drive base 16. It is contemplated that the stator 68 may be directly attached to the disk drive base 16 (such as shown) or may be attached to an intermediate supporting structure, which in turn is attached to the disk drive base 16.

The act 230 of determining an imbalance reference angle of the spindle motor hub 58 relative to the disk drive base 16 is in relation to the angular position about the axis of rotation 26. It is contemplated that the determination of the imbalance reference angle may be effected according to any of those methods which are well known to one of ordinary skill in the art. This may include use of various sensors such as accelerometers, optical sensors and piezoelectric devices that are mounted to the disk drive 10 or tooling associated therewith.

The act 230 may further include determining an imbalance magnitude of the spindle motor hub 58. It is contemplated that the determination of the imbalance magnitude may be effected according to any of those methods which are well known to one of ordinary skill in the art. This may include use of various sensors such as accelerometers, optical sensors and piezoelectric devices that are mounted to the disk drive 10 or tooling associated therewith. The balancing weight 82 may be selectively chosen from a group of balancing weights of differing weights based upon the imbalance magnitude. The group of balancing weights may be of various sizes and/or densities. For example, the group of balancing weights may be of all the same size, but formed of different types of materials, such as aluminum, brass, steel, copper, nylon, and plastic. In this regard, the greater the imbalance magnitude the greater the weight of the balancing weight 82.

The act 240 of attaching the balancing weight 82 to the balancing ring 74 may include positioning the retaining ring 74 with the weight engagement hole 88 adjacent the weight access opening 92. The balancing weight 82 may then be engaged to the weight engagement hole 88 through the weight access opening 92. The act 240 of attaching the balancing weight 82 to the balancing ring 74 may include positioning the retaining ring 74 with the weight engagement hole 88 adjacent the weight access opening 92. The balancing weight 82 may then be engaged to the weight engagement hole 88 through the weight access opening 92.

The step 250 may further include moving the balancing ring 74 from the disk drive base 16 and attaching the balancing ring 74 to the lower end 80 of the spindle motor hub 24 such as depicted in FIG. 12. The balancing ring 74 may be moved from the disk drive base 16 by allowing access of tooling (not shown) to engage the balancing ring 74 through the ring access opening 90. As such, the ring ends 84 with the installation holes 86 may be positioned adjacent the ring access opening 90 while the balancing ring 74 is disposed upon the disk drive base 16.

The balancing ring 74 may be attached to the lower end 80 of the spindle motor hub 58 after the attachment of the balancing weight 82 to the balancing ring 74. As shown in FIG. 11, the balancing weight 82 is attached to the balancing ring 74 while the balancing ring 74 is disposed upon the disk drive base 16. While the balancing weight 82 may be attached after the balancing ring 74 is attached to the spindle motor hub 58, it is preferable to attach it while on the disk drive base 16 as the spindle motor hub 58 would tend to rotate during attachment of the balancing weight 82.

I claim:

1. A disk drive comprising:
    a disk drive base;
    a spindle motor including a spindle motor hub, a spindle motor shaft and a stator, the spindle motor hub including an upper end and an opposing lower end, the spindle motor hub being rotatably coupled to the disk drive base via the spindle motor shaft for rotating the spindle motor hub about an axis of rotation, the lower end being disposed towards the disk drive base, the stator being attached to the disk drive base adjacent the lower end;
    a balancing ring attached to the lower end of the spindle motor hub about the spindle motor shaft; and
    a balancing weight attached to the balancing ring, the balancing weight being attachable to the balancing ring through the disk drive base and with the balancing ring attached to the lower end of the spindle motor hub, wherein the balancing ring is a C-ring and includes opposing ring ends, and wherein the disk drive base includes a ring access opening sized and configured to extend over the ring ends for allowing access to the ring ends through the disk drive base.

2. The disk drive of claim 1 wherein the disk drive base includes a weight access opening sized and configured to receive the balancing weight through the weight access opening for attachment of the balancing weight to the balancing ring.

3. The disk drive of claim 2 wherein the ring ends are positionable adjacent the ring access opening while the balancing weight is disposed adjacent the weight access opening.

4. A disk drive comprising:
a disk drive base;
a spindle motor including a spindle motor hub, a spindle motor shaft and a stator, the spindle motor hub including an upper end and an opposing lower end, the spindle motor hub being rotatably coupled to the disk drive base via the spindle motor shaft for rotating the spindle motor hub about an axis of rotation, the lower end being disposed towards the disk drive base, the stator being attached to the disk drive base adjacent the lower end;
a balancing ring attached to the lower end of the spindle motor hub about the spindle motor shaft; and
a balancing weight attached to the balancing ring, the balancing weight being attachable to the balancing ring through the disk drive base and with the balancing ring attached to the lower end of the spindle motor hub, wherein the disk drive base includes a weight access opening sized and configured to receive the balancing weight through the weight access opening for attachment of the balancing weight to the balancing ring.

5. The disk drive of claim 1 wherein the balancing ring is attached to the lower end with the balancing ring in contraction.

6. The disk drive of claim 1 wherein the balancing ring is attached to the lower end with the balancing ring in expansion.

7. The disk drive of claim 4 wherein the balancing weight is a screw.

8. The disk drive of claim 1 wherein the lower end of the spindle motor hub includes a circular groove disposed about the axis of rotation, the balancing ring is disposed in the circular groove.

9. A method of balancing a spindle motor hub of a disk drive, the disk drive including a disk drive base and a spindle motor, the spindle motor including the spindle motor hub, a spindle motor shaft and a stator, the spindle motor hub including an upper end and an opposing lower end, the method comprising the acts of:

a) providing a balancing ring at the disk drive base;

b) rotatably attaching the spindle motor hub to the disk drive base via the spindle motor shaft for rotating the spindle motor hub about an axis of rotation, the lower end being disposed towards the disk drive base, the stator being attached to the disk drive base adjacent the lower end, the balancing ring being disposed between the lower end of the spindle motor hub about the spindle motor shaft;

c) rotating the spindle motor hub;

d) determining an imbalance reference angle of the spindle motor hub relative to the disk drive base;

e) attaching a balancing weight to the balancing ring through a weight access opening in the disk drive base; and f) angularly positioning the balancing weight with respect to the lower end of the spindle motor hub based upon the imbalance reference angle.

10. The method of claim 9 wherein act d) further includes determining an imbalance magnitude of the spindle motor hub.

11. The method of claim 10 wherein act e) further includes selectively choosing the balancing weight from a group of balancing weights of differing weights based upon the imbalance magnitude.

12. The method of claim 9 wherein act e) further includes moving the balancing ring from the disk drive base and attaching the balancing ring to the lower end of the spindle motor hub.

13. The method of claim 12 wherein act e) the balancing ring is attached to the lower end of the spindle motor hub after the attachment of the balancing weight to the balancing ring.

* * * * *